3,069,460
PROCESS FOR THE PRODUCTION OF α,β-UNSATURATED ACIDS OF THE VITAMIN A SERIES
Karl Eiter, Koln-Stammheim, Hermann Oediger, Koln-Flittard, and Ernst Truscheit, Leverkusen, Germany, assignors to Farbenfabriken Bayer Aktiengesellschaft, Leverkusen, Germany, a corporation of Germany
No Drawing. Filed Dec. 15, 1959, Ser. No. 859,580
Claims priority, application Germany Dec. 19, 1958
11 Claims. (Cl. 260—514)

The present invention relates to a process for the production of α,β-unsaturated acids of the vitamin A series, wherein oxidoimino esters are used as intermediate products.

It is known that 5-(2',6',6'-trimethyl-cyclohexenyl-1')-3-methyl-2,3-oxido-4-pentenoic acid ethyl ester (a glycidic ester) can be prepared by reacting β-ionone with ethylchloroacetate in the presence of an alkali or alkaline earth alkoxide. The glycidic ester thus prepared can be converted into the β-$C_{14}$-aldehyde (4-(2',6',6'-trimethyl-cyclohexenyl-1')-2-methyl-2-butene-1-al) by saponification and decarboxylation but the yields are poor (U.S. patent specifications 2,369,156 and 2,369,160 to 2,369,167; I. Heilbron and coworkers, "Journal of the Chemical Society (London)" (1942), page 727 and page 502 (1946)).

The aforementioned β-$C_{14}$-aldehyde can only be obtained in high yields if, in the aforementioned process, the glycidic ester initially formed as an intermediate product is not isolated (U.S. patent specification 2,451,740). The high yields are entirely due to the immediate further processing of the glycidic ester, which is unstable.

It is an object of the present invention to provide new α,β-unsaturated acids of the vitamin A series. Another object of the present invention is to provide a new process for the production of α,β-unsaturated acids of the vitamin A series. And still another object is to use oxidoimino esters as intermediate products in said process for the production of α,β-unsaturated acids of the vitamin A series. A further object is to provide a process for the production of α,β-unsaturated acids of the vitamin A series which can readily be carried out and leads to substantial yields. A special object of the present invention is to introduce a second double bond into the trimethyl-cyclohexene ring of compounds of the vitamin A series. A still further object will become apparent hereinafter.

It has now been found that α,β-unsaturated acids of the vitamin A series can be obtained by way of very stable new oxidoimino esters of the vitamin A series, by reacting an α,β-unsaturated ketone or aldehyde of the vitamin A series with an α-halogenated fatty acid nitrile in the presence of an alkali or alkaline earth alkoxide, treating the resulting oxidoimino ester with an acid reagent to form an α-hydroxy carboxylic acid ester, splitting off water from the α-hydroxy carboxylic acid ester and saponifying the ester group. It is also possible first to saponify the ester group of the α-hydroxy carboxylic acid ester and then to split off water from the resulting acid.

The four reaction steps necessary in each case can be carried out separately in succession or in one processing step.

When the starting materials are β-ionone and chloroacetonitrile the course of the reaction is as shown in the following formula diagram:

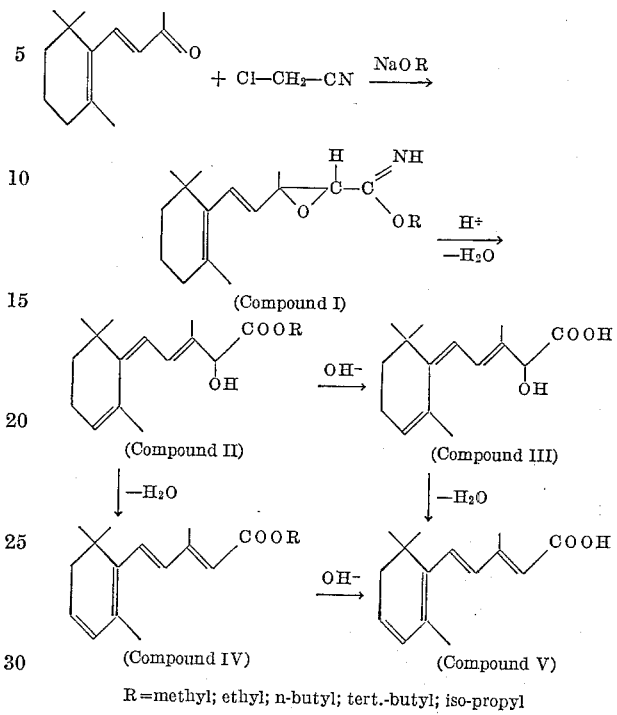

R=methyl; ethyl; n-butyl; tert.-butyl; iso-propyl

α,β-Unsaturated aldehydes and ketones of the vitamin A series are employed as starting materials in the process according to the present invention. In accordance with general scientific language by α,β-unsaturated aldehydes and ketones of the vitamin A series are meant all α,β-unsaturated aldehydes and ketones from which the carbon skeleton of vitamin A can be synthesised and which contain at least a trimethyl cyclohexane radical which may be partially dehydrated. Specific examples of α,β-unsaturated aldehydes and ketones suitable for employment in the process according to the present invention are β-ionone, β-cyclocitral, 5-(2',6',6'-trimethyl-cyclohexenyl-1')-3-methyl - 2,4 - pentadiene-1-al (β-ionylidene acetaldehyde, β-$C_{15}$-aldehyde), 8-(2',6',6'-trimethyl-cyclohexenyl-1')-6-methyl-3,5,7-octatriene - 2 - one, known as β-$C_{18}$-ketone, 8 - (2',6',6'-trimethyl-cyclohexenyl-1')-2,6-dimethyl-2,4,6-octatriene-1-al (β-$C_{19}$-aldehyde), 6-(2',6',6'-trimethyl-cyclohexenyl-1')-4-methyl - 2,4 - hexadiene-1-al (β-$C_{16}$-aldehyde) and 4 - (2',6',6' - trimethyl-cyclohexenyl-1')-2-methyl-2-butene-1-al (β-$C_{14}$-aldehyde). As α-halogenated fatty acid nitriles, there may be employed in the process according to the present invention chloroacetonitrile, bromoacetonitrile and α-chloropropionitrile.

The reaction of α,β-unsaturated ketones and aldehydes of the vitamin A series with α-halogenated fatty acid nitriles is carried out in the presence of alkali or alkaline earth alkoxides. By carrying out the reaction in this manner oxidoimino esters (Compound I) are obtained by the simultaneous addition of an alkoxide to the nitrile group, whereas it would be expected that oxidonitriles would be formed as a result of this reaction. The yields in this stage of the process are higher than 90%, and the products are of an exceptionally high degree of purity.

It is preferable to carry out the reaction either in the absence of a solvent or in the presence of a low molecular weight alcohol or an inert solvent, such as benzene, toluene, cyclohexane, petroleum ether, ether or dimethyl formamide or a mixture thereof, at a temperature of from −50° C. to +100° C., and preferably at a temperature of from −20° C. to +20° C. and with exclusion of moisture and oxygen.

Preferably, one mol of the carbonyl compound is condensed with from 1.0 to 1.5 (preferably 1.1) mols of the halogenated nitrile in the presence of from 2.0 to 3.5, preferably 2.5, mols of an alkali or alkaline earth alkoxide, for example sodium ethoxide, potassium methoxide or calcium ethoxide. Very good results are obtained if the mixture, after having been reacted for from 1 to 20 hours, is poured into an aqueous ammonium chloride solution at a temperature below 20° C. The oxidoimino esters which are obtained, in contrast to the corresponding oxido esters, are very stable and can be distilled under reduced pressure.

By treating the oxidoimino esters, for example 5-(2',6',6' - trimethyl - cyclohexenyl - 1') - 3 - methyl - 2,3-oxido-4-pentenoic iminoacid-alkyl ester (compound I) or 9-(2',6',6'-trimethyl-cyclohexenyl-1'),3,7-dimethyl-2,3-oxido-4,6,8-nonatrienoic iminoacid-alkyl ester, with acids, the imino groups is saponified with simultaneous hydrolytic splitting of the epoxide ring and the α-hydroxycarboxylic acid ester (see in this respect, for example Compound II) is formed by the loss of 1 molecule of water. It is preferable to use an excess of an aqueous mineral acid, for example hydrochloric acid, sulphuric acid or phosphoric acid, or a low molecular weight aliphatic carboxylic acid, such as acetic acid. The oxidoimino ester is shaken with the acid, if desired with the addition of a small quantity of a solution promoter, such as an alcohol, ether, benzene or dimethyl formamide, preferably at room temperature, although elevated temperatures up to about 90° C. may be employed if desired.

The α-hydroxycarboxylic acid esters of the vitamin A series thus obtained may be acetylated at the hydroxy group in known manner, for example with acetyl chloride and pyridine.

The desired α,β-unsaturated acids of the vitamin A series may be obtained from the α-hydroxycarboxylic acids, for example from 5-(2',6',6'-trimethylcyclohexylidene-2')-3-methyl-2-hydroxy-3-pentenoic acid-alkyl ester or from 9-(2',6',6'-trimethylcyclohexenylidene-2')-3,7-dimethyl-2-hydroxy-3,5,7-nonatrienoic acid-alkyl ester, by two methods.

Water may be split off from the α-hydroxyesters (see for example Compound II) by allowing them to stand in contact with known dehydrating agents either at room temperature or at an elevated temperature up to 150° C. Suitable dehydrating agents are phosphorous tribromide, phosphorus trichloride, phosphorus pentoxide and quinoline or dimethyl aniline, in an inert solvent, such as toluene, mesitylene, ether, dioxane or benzene. The resulting α,β-unsaturated esters of the type of Compound IV, for example the 5-(2',6',6'-trimethylcyclohexadienyl-1',3')-3-methyl-2,4-pentadienoic acid-ethyl ester or the 9-(2',6',6'-trimethylcyclohexadienyl-1',3')-3,7 - dimethyl-2,4,6,8-nonatetraenoic acid-alkyl ester, are then saponified with aqueous alcoholic alkali hydroxide solution in slight excess at room temperature or at the boiling point of the solvent (if a solvent is employed) to form the corresponding acids.

Alternatively, the α-hydroxy esters (see for example Compound II) may be saponified under the aforementioned saponification conditions. From the α-hydroxy-acids thus obtained (see for example Compound III) it is possible to split off water with dehydrating agents, such as phosphorus pentoxide, sodium acetate-glacial acetic acid or iodine or by simple heating in vacuo, if desired in the presence of powdered copper, with or without solvents, and in accordance with known processes, whereby the desired α,β-unsaturated acids, are formed for example 5 - (2',6',6' - trimethylcyclohexadienyl - 1',3')-3-methyl-2,4-pentadienoic acid (Compound V) or 9-(2'6',6'-trimethylcyclohexadienyl - 1',3') - 3,7 - dimethyl - 2-4,6,8-nonatetraenoic acid, known as vitamin $A_2$ acid. Suitable solvents are high-boiling inert solvents, such as xylene, mesitylene and quinoline.

The hydroxy acids are preferably heated with agents which split off water, for example with phosphorus oxychloride and pyridine in benzene or also without any additional compounds under reduced pressure, in the latter case preferably only up to the temperature at which the splitting of water just commences. In this way, undesired side reactions are obviated.

The products obtained according to the invention represent valuable intermediate products for the synthesis of biologically active substances of the vitamin A series, for example vitamin $A_2$ can be prepared by reducing vitamin $A_2$ acid with known reducing agents (N. L. Wendler et al.: Journal of the American Chemical Society 73, 719 (1951)).

The invention is further illustrated by the following examples without in any way limiting it thereto.

*Example 1*

9.6 parts by weight of β-ionone and 5.3 parts by weight of chloroacetonitrile are dissolved in 10 parts by volume of anhydrous benzene or ether and cooled to −20° C. with exclusion of moisture and oxygen. 9.5 parts by weight of sodium methoxide are added to the resulting solution over a period of 15 minutes, while stirring. The mixture is stirred for 15 minutes at −20° C. and is then allowed to stand for 20 hours at 0° C. The reaction mixture is then poured into 50 parts by volume of saturated, ice-cold ammonium chloride solution and extracted with ether. The ether extract is washed neutral with sodium chloride solution and then dried over anhydrous sodium sulphate. Crude 5-(2',6',6'-trimethyl cyclohexenyl-1')-3-methyl-2,3-oxido-4-pentenoic imino-acid-methyl ester is obtained after evaporating the solvent. The crude ester can be purified by high vacuum distillation. Yield: 12.0 parts by weight (91% of the theoretical). B.P.$_{0.003}$=100–110° C. $\lambda_{max}$=244m/μ ($\epsilon$=6200).

*Example 2*

19 parts by weight of sodium ethoxide are added, over a period of 15 minutes and at a temperature of 0° C., to 19.2 parts by weight of β-ionone and 10.6 parts by weight of chloroacetonitrile in 20 parts by volume of anhydrous benzene. The addition is carried out with exclusion of moisture and oxygen. The mixture is left at 0° C. for 15 minutes. It is then heated to 20° C. and after 6 hours is poured into 100 parts by volume of saturated ammonium chloride solution at 10° C. The reaction product is extracted with ether. The ether extract is washed neutral with saturated sodium chloride solution and dried over anhydrous sodium sulphate. After removing the solvent there are obtained by vacuum distillation 25.4 parts by weight (91% of the theoretical) of 5-(2',6',6'-trimethylcyclohexenyl-1')-3-methyl-2,3-oxido - 4 - pentenoic iminoacid ethyl ester. B.P.$_{0.003}$=110–120° C. $\lambda_{max}$=245m/μ ($\epsilon$=6700).

The corresponding tert.-butyl ester is obtained by employing potassium tert.-butoxide instead of sodium ethoxide.

*Example 3*

10 parts by weight of 5-(2',6',6'-trimethylcyclohexenyl-1')-3-methyl-2,3-oxido-4-pentenoic iminoacid-ethyl ester are shaken with 30 parts by volume of ether and 20 parts by volume of 5 N-hydrochloric acid for 4 hours at room temperature. The aqueous acidic phase is then separated and the etheral solution is washed neutral with water and sodium bicarbonate solution. There are thus obtained 9.5 parts by weight (95% of the theoretical) of 5-(2',6',6'-trimethylcyclohexenylidene-2')-3-methyl - 2 - hydroxy-3-pentenoic acid-ethyl ester in the form of a light yellow oil. B.P.$_{0.003}$=120–130° C. $\lambda_{max}$=280 m/μ (ϵ=25,000).

31.0 parts by weight of 5-(2',6',6'-trimethylcyclohexenylidene-2')-3-methyl-2-hydroxy - 3 - pentenoic acid ethyl ester are heated to boiling point, together with 17.5 parts by weight of acetyl chloride and 24 parts by weight of pyridine in 100 parts by volume of anhydrous benzene for four hours with exclusion of moisture. The reaction solution is poured into water, extracted with 2 N-hydrochloric acid and washed until neutral. There are thus obtained 31.4 parts by weight (87% of the theoretical) of 5 - (2',6',6'-trimethylcyclohexenylidene-2')-3-methyl-2-acetoxy-3-pentenoic acid-ethyl ester in the form of a yellow viscose oil. B.P.$_{0.001}$=120–130° C. $\lambda_{max}$=290 m/μ (ϵ=19,000).

*Example 4*

9.5 parts by weight of 5-(2',6',6'-trimethylcyclohexenylidene-2')-3-methyl-2-hydroxy - 3 - pentenoic acid-ethyl ester are heated to boiling point with 15 parts by volume of a 10% methanolic sodium hydroxide solution for 4 hours in an atmosphere of nitrogen. The methanol is then evaporated in vacuo. The residue is dissolved in water and the unsaponified substance is extracted with ether. After acidifying the aqueous extract with 10% phosphoric acid, there is obtained 7 parts by weight (82% of the theoretical) of 5-(2',6',6'-trimethyl-cyclohexenylidene-2')-3-methyl-2-hydroxy - 3 - pentenoic acid. The acid melts after recrystallisation from ether-petroleum ether at 127–129° C. under decomposition; $\lambda_{max}$=286 m/μ (ϵ=30,500).

*Example 5*

7 parts by weight of 5-(2',6',6'-trimethylcyclohexenylidene-2')-3-methyl-2-hydroxy - 3 - pentenoic acid are heated in vacuo to 110° C. The splitting off of water which is thus initiated is completed after 1 hour. The reaction product is taken up in ether and the acid constituents are extracted with soda solution. 5-(2',6',6'-trimethyl-cyclohexadienyl-1',3')-3-methyl-2,4-pentadienoic acid is obtained by acidification of the soda solution with 10% phosphoric acid. The product melts at 129–131° C. after it has been recrystallised from ether-petroleum ether. $\lambda_{max}$=334 m/μ, 255 m/μ (ϵ=18,000, 13,000).

*Example 6*

7.9 parts by weight of 5-(2',6',6'-trimethylcyclohexenylidene-2')-3-methyl-2-hydroxy - 3 - pentenoic acid-methyl ester and 7.74 parts by weight of quinoline are dissolved in 35 parts by volume of anhydrous xylene. A solution of 2.05 parts by weight of phosphorus trichloride in 20 parts by volume of anhydrous xylene is added dropwise with stirring to the aforementioned solution at a temperature from 0° C. to 5° C., care being taken to exclude moisture during the addition. The mixture is stirred for 30 minutes at room temperature and then heated for 1 hour under reflux. The reaction solution is then cooled and poured into a mixture of 100 parts by volume of 3N-sulphuric acid and 30 parts by weight of ice. The organic phase is extracted with ether and the excess quinoline is removed therefrom with dilute sulphuric acid. The organic phase is then washed neutral with water and dried over anhydrous sodium sulphate. Crude 5-(2',6',6'-trimethylcyclohexadienyl-1',3')-3-methyl - 2,4 - pentadienoic acid-methyl ester is obtained after evaporating off the solvent. The crude ester can be purified by chromatography on weakly deactivated neutral aluminium oxide followed by high vacuum distillation. There are thus obtained 3 parts by weight (41% of the theoretical) of a yellow oil. B.P.$_{0.001}$=100–110° C.; $\lambda_{max}$=345 m/μ, 260 m/μ (ϵ=16,000, 11,000).

*Saponification.*—3 parts by weight of 5-(2',6',6'-trimethylcyclohexadienyl-1',3') - 3 - methyl-2,4-pentadienoic acid-methyl ester are left standing in 8.4 parts by volume of a 10% methanolic potassium hydroxide solution for 24 hours under nitrogen at room temperature. The solvent is then evaporated under reduced pressure. The residue is dissolved in water and the unsaponified substance extracted with ether. After acidifying the aqueous extract with 10% phosphoric acid, there are obtained 2.3 parts by weight (81% of the theoretical) of 5-(2',6',6'-trimethyl-cyclohexadienyl-1',3')-3-methyl - 2,4 - pentadienoic acid, which melts at 129–131° C. after being recrystallised from ether-petroleum ether.

We claim:

1. 5 - (2',6',6' - trimethylcyclohexadienyl - 1',3') - 3-methyl-2,4-pentadienoic acid.

2. A process for the production of α,β-unsaturated acids of the vitamin A series characterized by the structural configuration

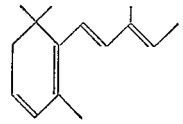

which comprises the steps of (1) reacting in an organic solvent medium selected from the group consisting of benzene, toluene, cyclohexane, petroleum ether, diethyl ether, dimethyl formamide and mixtures thereof, an α,β-unsaturated carbonyl compound selected from the group consisting of β-ionone, β-cyclocitral, 5-(2',6',6'-trimethyl-cyclohexenyl-1')-3-methyl-2,4-pentadiene-1-al, 8-(2',6',6'-trimethyl-cyclohexenyl-1')-6-methyl - 3,5,7 - octatriene-2-one, 8 - (2',6',6'-trimethyl-cyclohexenyl-1')-2,6-dimethyl-2,4,6-octatriene - 1 - al, 6-(2',6',6'-trimethyl-cyclohexenyl-1')-4-methyl-2,4-hexadiene-1-al, and 4-(2',6',6'-trimethyl-cyclohexenyl-1')-2-methyl-2-butene-1-al with an α-halogenated lower aliphatic acid nitrile selected from the group consisting of chloroacetonitrile, bromoacetonitrile and α-chloropropionitrile in the presence of a member selected from the group consisting of alkali metal and alkaline earth metal alkoxides, at a temperature within the range of from —50° C.–100° C. and utilizing from 1.0–1.5 mols of the nitrile per mol of α,β-unsaturated carbonyl compound to produce the corresponding oxido imino ester; (2) reacting the product thus obtained with an acid selected from the group consisting of hydrochloric acid, sulfuric acid, acetic acid, and phosphoric acid to produce the corresponding α-hydroxy-carboxylic acid alkyl ester having from 1–4 carbon atoms in the alkyl radical; (3) saponifying the thus produced α-hydroxy-carboxylic-acid alkyl ester with an aqueous alcoholic alkali hydroxide solution, whereby the corresponding free α-hydroxy-carboxylic acid is produced, and (4) contacting the thus produced α-hydroxy-carboxylic acid with a dehydrating agent selected from the group consisting of phosphorus pentoxide, phosphorus tribromide, phosphorus trichloride, quinoline, dimethyl aniline, sodium acetate, glacial acetic acid and iodine, under splitting off of water to thereby produce the α,β-unsaturated acid of the vitamin A series.

3. A process for the production of α,β-unsaturated acids of the vitamin A series characterized by the structural configuration

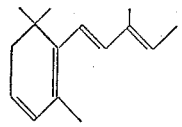

which comprises the steps of (1) reacting in an organic solvent medium selected from the group consisting of benzene, toluene, cyclohexane, petroleum ether, diethyl ether, dimethyl formamide and mixtures thereof, an α,β-unsaturated carbonyl compound selected from the group consisting of β-ionone, β-cyclocitral, 5-(2',6',6'-trimethyl-cyclohexenyl-1')-3-methyl-2,4-pentadiene-1-al, 8-(2',6',6'- trimethyl-cyclohexenyl-1')-6-methyl - 3,5,7 - octratriene-2-one, 8 - (2',6',6'-trimethyl-cyclohexenyl-1')-2,6-dimethyl-2,4,6 - octatriene-1-al, 6-(2',6',6'-trimethyl-cyclohexenyl-1')-4-methyl-2,4-hexadiene - 1 - al, and 4-(2',6',6'-trimethyl - cyclohexenyl-1')-2-methyl - 2 - butene-1-al with an $\alpha$-halogenated lower aliphatic acid nitrile selected from the group consisting of chloroacetonitrile, bromoacetonitrile and $\alpha$-chloropropionitrile in the presence of a member selected from the group consisting of alkali metal and alkaline earth metal alkoxides, at a temperature within the range of from $-50°$ C.$-100°$ C. and utilizing from 1.0–1.5 mols of the nitrile per mol of $\alpha,\beta$-unsaturated carbonyl compound to produce the corresponding oxido imino ester; (2) reacting the product thus obtained with an acid selected from the group consisting of hydrochloric acid, sulfuric acid, acetic acid, and phosphoric acid to produce the corresponding $\alpha$-hydroxy-carboxylic acid alkyl ester having from 1–4 carbon atoms in the alkyl radical; (3) contacting the $\alpha$-hydroxy-carboxylic acid alkyl ester thus produced with a dehydrating agent under splitting off of water whereby the corresponding $\alpha,\beta$-unsaturated acid ester is produced, and (4) saponifying the said $\alpha,\beta$-unsaturated acid ester with an aqueous alcoholic alkali hydroxide solution to produce the $\alpha,\beta$-unsaturated acid of the vitamin A series.

4. Process according to claim 2, which comprises effecting the reaction of said $\alpha,\beta$-unsaturated carbonyl compound with said $\alpha$-halogenated lower aliphatic acid nitrile at a temperature within the range of from $-20°-+20°$ C.

5. Process according to claim 3, which comprises effecting the reaction of said $\alpha,\beta$-unsaturated carbonyl compound with said $\alpha$-halogenated lower aliphatic acid nitrile at a temperature within the range of from $-20°-+20°$ C.

6. Process according to claim 2, which comprises utilizing 1.1 mols of said $\alpha$-halogenated lower aliphatic acid nitrile per mol of $\alpha,\beta$-unsaturated carbonyl compound in the presence of 2.5 mols of said alkoxide group member.

7. Process according to claim 3, which comprises utilizing 1.1 mols of said $\alpha$-halogenated lower aliphatic acid nitrile per mol of $\alpha,\beta$-unsaturated carbonyl compound in the presence of 2.5 mols of said alkoxide group member.

8. Process according to claim 2, wherein said alkoxide group member is a member selected from the group consisting of sodium ethoxide, potassium methoxide and calcium ethoxide.

9. Process according to claim 3, wherein said alkoxide group member is a member selected from the group consisting of sodium ethoxide, potassium methoxide and calcium ethoxide.

10. A process for the production of 5-(2',6',6'-trimethyl-cyclohexadienyl-1'-3')-3-methyl - 2,4 - pentadienoic acid which comprises the steps of reacting in the presence of benzene, as solvent, $\beta$-ionone and chloroacetonitrile in the further presence of sodium methoxide at a temperature of from $-20°-0°$ C., and utilizing 9.6 parts by weight of $\beta$-ionone per 5.3 parts by weight of chloroacetonitrile per 9.5 parts by weight of sodium methoxide to produce 5-(2',6',6'-trimethyl cyclohexenyl-1')-3-methyl-2,3-oxido-4-pentenoic imino-acid-methyl ester; (2) reacting the product thus obtained with hydrochloric acid to produce 5-(2',6',6'-trimethylcyclohexenylidene-2')-3-methyl-2-hydroxy-3-pentenoic acid-ethyl ester; (3) contacting the thus produced 5-(2',6',6'-trimethylcyclohexenylidene-2')-3-methyl-2-hydroxy-3-pentenoic acid-ethyl ester with acetyl chloride and pyridine under splitting off of water to thereby produce 5-(2',6',6'-trimethylcyclohexenylidene-2')-3-methyl-2-acetoxy-3-pentenoic acid-ethyl ester; and (4) saponifying the thus produced 5-(2',6',6'-trimethylcyclohexenylidene-2') - 3 - methyl-2-acetoxy-3-pentenoic acid-ethyl ester with methanolic sodium hydroxide solution whereby 5-(2',6',6'-trimethylcyclohexenylidene-2')-3-methyl-2-hydroxy-3-pentenoic acid-ethyl ester is produced.

11. A process for the production of 5-(2',6',6'-trimethyl cyclohexadienyl-1'-3')-3-methyl-2,4 - pentadienoic acid, which comprises the steps of reacting in the presence of benzene as solvent, $\beta$-ionone and chloroacetonitrile in the presence of sodium methoxide at a temperature of from $-20°-0°$ C. and utilizing 9.6 parts by weight of $\beta$-ionone per 5.3 parts by weight of chloroacetonitrile per 9.5 parts by weight of sodium methoxide to produce 5-(2',6',6'-trimethyl cyclohexenyl-1)-3-methyl-2,3-oxido-4-pentenoic imino-acid-methyl ester; (2) reacting the product thus obtained with hydrochloric acid to produce 5-(2',6',6'-trimethylcyclohexenylidene-2')-3-methyl-2-hydroxy-3 - pentenoic acid-ethyl ester; saponifying the thus produced 5-(2',6',6'-trimethyl-cyclohexenylidene-2')-3-methyl-2 - hydroxy-3-pentenoic acid-ethyl ester with methanolic sodium hydroxide solution, whereby 5-(2',6',6'-trimethylcyclohexenylidene-2')-3-methyl-2-hydroxy-3 - pentenoic acid-ethyl ester is produced; and (4) dehydrating the 5-(2',6',6'-trimethylcyclohexenylidene-2')-3-methyl-2-hydroxy - 3-pentenoic acid-ethyl ester thus produced by heating in vacuo to thereby produce 5-(2',6',6'-trimethylcyclohexadienyl-1',3')-3-methyl-2,4-pentadienoic acid.

References Cited in the file of this patent

UNITED STATES PATENTS

| | | |
|---|---|---|
| 2,680,755 | Robeson et al. | June 8, 1954 |
| 2,843,631 | Isler et al. | July 15, 1958 |
| 2,874,183 | Isler et al. | Feb. 17, 1959 |

OTHER REFERENCES

Rittinger: "Darstellung und Reaktionin von Glycidsaurenitrilen," February 13, 1957, pages 3–4, 260–348A. (Available in Div. 6.)